United States Patent [19]

Shibata

[11] Patent Number: 5,058,729

[45] Date of Patent: * Oct. 22, 1991

[54] CONTINUOUS CONVEYOR APPARATUS

[76] Inventor: Katsuaki Shibata, 845-38, Ogoori-shi, Tsuko, Fukuoka, Japan

[*] Notice: The portion of the term of this patent subsequent to Nov. 28, 2006 has been disclaimed.

[21] Appl. No.: 426,883

[22] Filed: Oct. 25, 1989

Related U.S. Application Data

[63] Continuation-in-part of Ser. No. 93,881, Sep. 8, 1987, Pat. No. 4,883,167.

[30] Foreign Application Priority Data

Sep. 19, 1986 [JP] Japan .................................. 61-221643
Jun. 17, 1987 [JP] Japan .................................. 62-149058

[51] Int. Cl.5 ............................................ B65G 17/36
[52] U.S. Cl. .................................. 198/712; 198/799
[58] Field of Search ............... 198/499, 607, 701, 703, 198/705, 708, 712, 715, 799, 813

[56] References Cited

U.S. PATENT DOCUMENTS

| | | | |
|---|---|---|---|
| 1,250,125 | 12/1917 | Baker et al. ........................... | 198/799 |
| 3,961,704 | 6/1976 | Rochester ............................. | 198/499 |
| 4,232,782 | 11/1980 | Ikeda et al. ........................... | 198/712 |
| 4,440,097 | 4/1984 | Teske .................................... | 198/813 |
| 4,883,167 | 11/1989 | Shibata ................................. | 198/712 |

FOREIGN PATENT DOCUMENTS

| | | | |
|---|---|---|---|
| 1000283 | 1/1957 | Fed. Rep. of Germany ...... | 198/712 |
| 3502946 | 7/1986 | Fed. Rep. of Germany ...... | 198/712 |
| 1409731 | 7/1965 | France ................................. | 198/712 |
| 152707 | 9/1983 | Japan ................................... | 198/705 |
| 41691 | 2/1986 | Japan ................................... | 198/712 |
| 446183 | 3/1968 | Switzerland ......................... | 198/712 |

Primary Examiner—Joseph E. Valenza
Attorney, Agent, or Firm—Henry C. Nields

[57] ABSTRACT

A continuous conveyor apparatus is provided, comprising tandem wheels and coaxial wheels appropriately positioned. Four endless link chains are turned around the wheels, and a plurality of carrying vessels having arms are connected to the four link chains through the arms. The coaxial wheels have a pair of inner wheels and a pair of outer wheels coaxially arranged. The tandem wheels have a pair of inner wheels and a pair of outer wheels horizontally arranged with a space therebetween. The apparatus is durable, lightweight and can be produced at low cost.

12 Claims, 15 Drawing Sheets

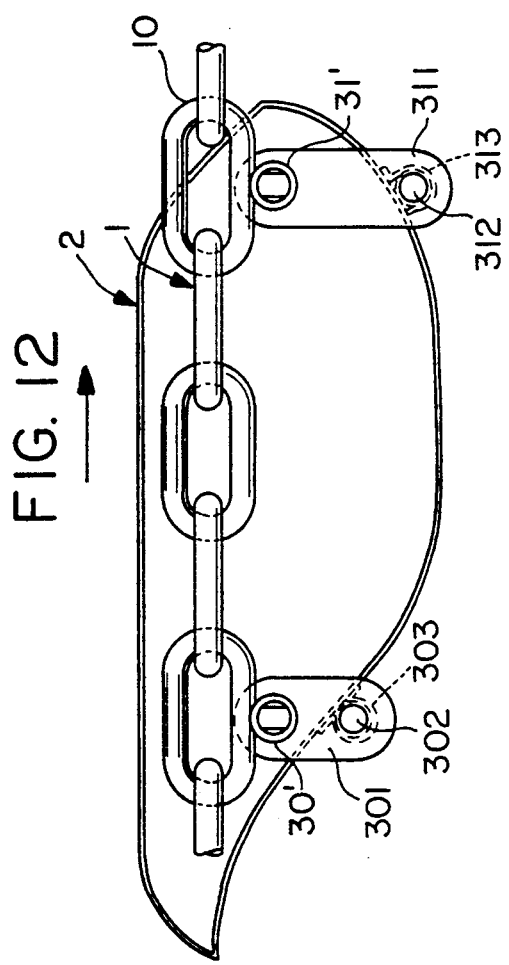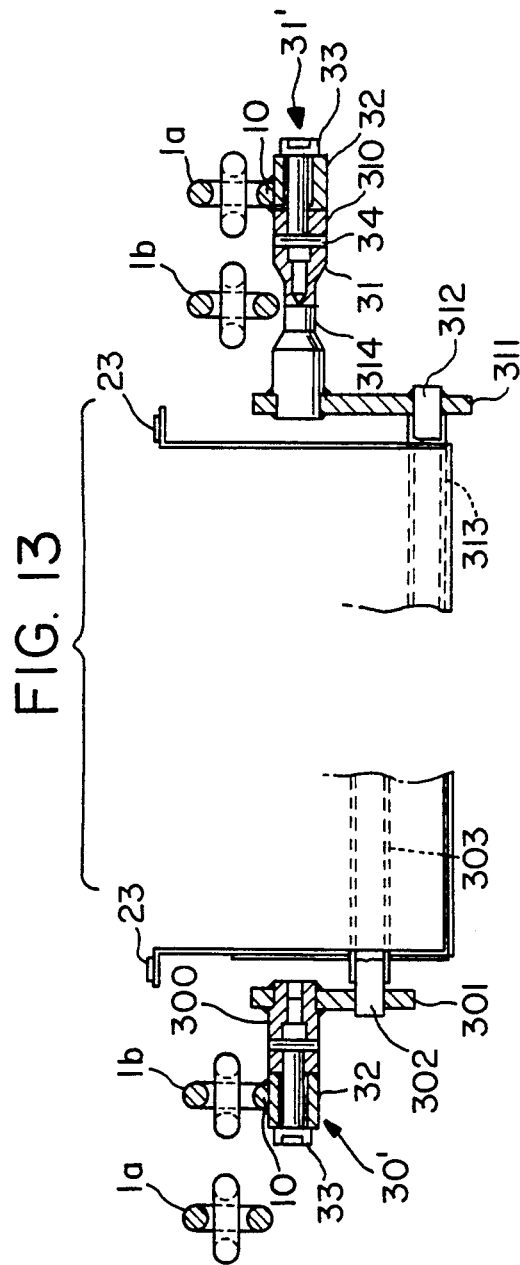

CONTINUOUS CONVEYOR APPARATUS

This application is a continuation-in-part of prior copending application Ser. No. 093,881, filed Sept. 8, 1987, now U.S. Pat. No. 4,883,167.

BACKGROUND OF THE INVENTION

The present invention relates to a continuous conveyor apparatus, more specifically to a continuous conveyor apparatus of high durability and of light weight which can be produced at a lower cost.

There is a conventional conveyor apparatus referred to as a continuous conveyor apparatus which comprises a carrying vessel, four roller chains connected to the four corners of the carrying vessel to support the vessel and a sprocket wheel around which the roller chain turns to move the carrying vessel in horizontal and vertical directions, thereby continuously conveying bulk, soil, sand and so on.

The conventional conveyor apparatus has some shortcomings that the life of the roller chain is short, that the total size of the apparatus is large, and that the production cost is high. Another disadvantage is that the lower part of the conventional conveyor apparatus could not be moved because the lower part of the conventional conveyor apparatus may interfere with operation such as excavation. In addition, it is required that the roller chain is precisely positioned when the roller chain is turned around the sprocket, which is against workability. In particular, since the sprocket, with which the roller chain comes into contact with the upper surface of carrying vessel, has a notch which allows the relief of a coupling provided between the roller chain and the carrying vessel, a lot of manpower is required for positioning of notch and the coupling.

SUMMARY OF THE INVENTION

An object of present invention is to provide a conveyor apparatus having a long life.

Another object of the present invention is to provide a conveyor apparatus of light weight produced at a low cost.

Another object of the present invention is to provide a conveyor apparatus having a lower portion rotatable so as not to interfere with the work operation.

Another object of the present invention is to provide a conveyor apparatus the assembling such as chain installation of which is easy.

The present inventors made various researches into chains to overcome the shortcomings of the conventional conveyor apparatus.

The roller chain is always used in the conventional conveyor apparatus, for it is believed that the roller chain has a long life, which is appreciated in spite of the complex construction and the high cost of the roller chain.

It is recognized, however, that lubricant does not reach between the roller and the bush in the roller chain, and that the life of the roller chain is not so long as generally believed. On the other hand, the performance of link chain (generally referred to as short link chain) is improved as the technology of heat treatment and welding has recently been developing. It is found that the link chain is of simple construction, through which lubricant generally sufficiently penetrates, so that the link chain has better abrasion resistance than the roller chain. In addition, it is possible to produce a high speed and compact type of link chain comparing with the roller chain, and the link chain can be twisted, so that it is possible to bend the link chain in three dimensions. Accordingly, the continuous conveyor apparatus equipped with the link chain can be rotated at its lower portion as required in operation. Furthermore, when used in loading and unloading for ships, the link chain is hardly slipped out of the wheel even upon rolling or another sway of the ships since the link chain is possible to bend in three dimensions.

The following are advantages of the link chain over the roller chain;

1. The construction is simple, in which each link is placed in surface contact and lubricant generally penetrates throughout the system, resulting in low abrasion and long life of the chain.
2. It is simple in construction and light in weight, and small in chain tension, so that the motor capacity and the size of each member can be reduced, leading to a lower cost.
3. The link chain can be twisted and bent in three dimensions, so that the apparatus can be rotated as required in work and is suitable for loading and unloading in ships.
4. Each link can have a small pitch leading to lower noise and high speed. In addition, the wheel around which the chain goes can be made small.
5. Fittings of the carrying vessel can be easily attached to the link chain by way of welding, forging or use of bolts.

On the basis of the advantages of the link chain as set forth above, the link chain is adopted for chain in the present invention, which leads to realization of a wheel of simple structure. In addition, the wheel is improved in other features, and thus a continuous conveyor apparatus with excellent workability is accomplished eliminating necessity of centering.

BRIEF DESCRIPTION OF THE DRAWINGS

FIG. 12 is an enlarged side elevational view of a joint portion between the carrying vessel and the link chain of the embodiment in FIG. 11.

FIG. 13 is a partially cut away and partially cross sectional, front elevational view of the embodiment of FIG. 12.

DETAILED DESCRIPTION OF THE PREFERRED EMBODIMENTS

The following is a description of embodiments of the present invention.

Figure 1:
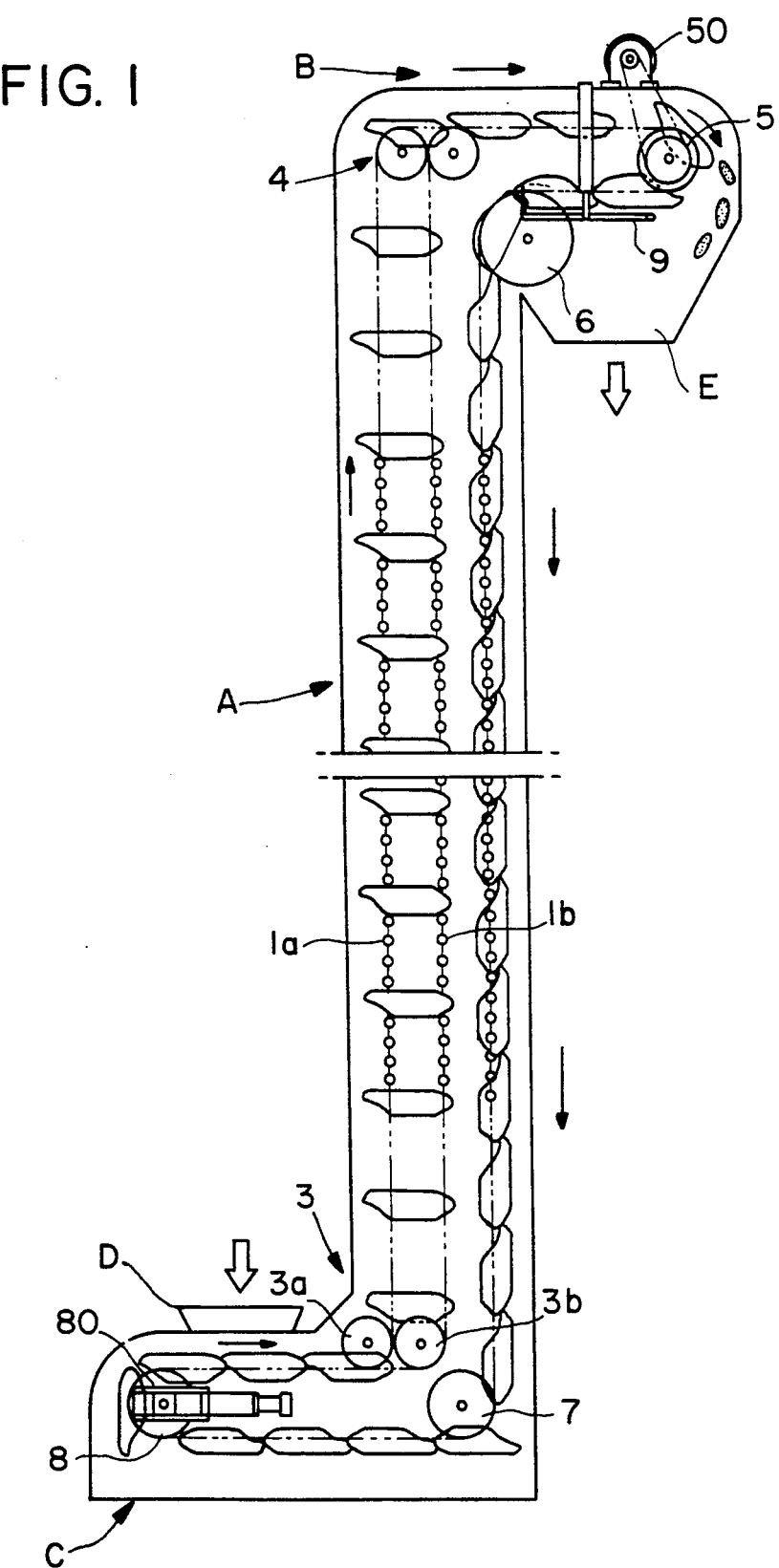
FIG. 1 is a slide elevational view showing one embodiment of the continuous conveyor apparatus of the present invention.

FIG. 1 is a side elevational view of one of the embodiments, which comprises a vertical conveyor section A, a lower horizontal conveyor section C and upper horizontal conveyor section B. The lower horizontal conveyor section C and the upper horizontal conveyor section B extend in the directions opposite to each other to form a continuous conveyor apparatus of so called "S-shape type".

Placed at the bent portions are tandem wheel means and coaxial wheel means. Specifically, the tandem wheel means are a lower tandem wheel means 3 and an upper tandem wheel means 4, while the coaxial wheel means are a driving coaxial wheel means 5, an upper corner coaxial wheel means 6, a lower corner coaxial wheel means 7 and a return coaxial wheel means 8. These wheel means are positioned in place, around which four endless link chains are turned. Specifically, each wheel means comprises a pair of inner wheels around which a pair of inner link chains are turned, and a pair of outer wheels around which a pair of outer link chains are turned.

The term "tandem wheel means" is used to designate a pair of wheels horizontally arranged with a predetermined space therebetween to change the carrying direction with a carrying vessel 2 maintained in the horizontal attitude which is set forth hereinafter. The words "tandem wheel" is used hereinafter instead of the tandem wheel means. The tandem wheels are usually made in a cantilever structure having no shaft at the central portion thereof except for the wheel in front (on the right hand side of FIG. 1) of the upper tandem wheel 4 to allow the carrying vessel to pass by.

The coaxial wheel means comprise a first pair of wheels and a second pair of wheels coaxially arranged to change the direction of the carrying vessel 2 mounted to the four chains 1, which is set forth hereinafter. The term "coaxial wheel" is used hereinafter instead of the coaxial wheel means.

As previously set forth, the link chain 1 is connected to the carrying vessel 2 at each of the four corners thereof. An item to be carried is received at an supply port D in the lower horizontal conveyor section C, turned to a vertical direction upwards at the lower tandem wheel 3, turned to a horizontal direction again at the upper tandem wheel 4, inversed in attitude at the driving coaxial wheel 5 to drop the item into a discharge port E. Then, the carrying vessel 2 in the inversed attitude is moved in a horizontal direction, and at the upper corner coxial wheel 6 turned again in vertical direction of descending, during which the carrying vessel 2 is carried in a vertically upright condition. Then, the vessel is turned in a horizontal direction at the lower corner coaxial wheel 7 and moved in a horizontal direction in the inversed condition, turned by 180 degrees at the return coaxial wheel 8 to receive the item to be carried at supply port D again. The above steps are repeated.

The operation of the continuous conveyor apparatus are mentioned above is accomplished by the cooperation of the tandem wheels and the coaxial wheels in combination.

The relationships between each wheel and the link chain 1 and the carrying vessel 2 are set forth hereinafter.

Figure 2:
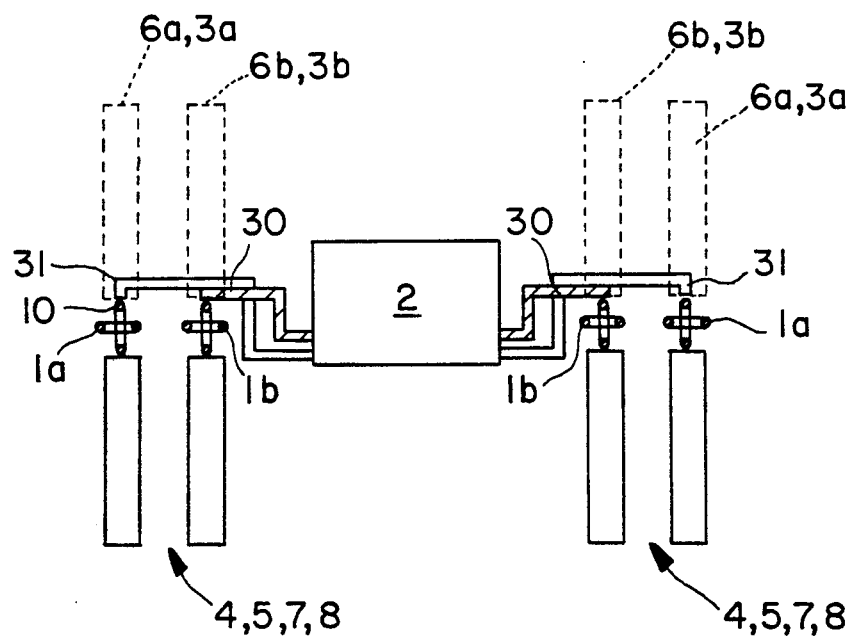
FIG. 2 is a schematic view showing the relationship between link chains and a carrying vessel used in the present invention.

FIG. 2 is a schematic view of the wheel, the link chain 1 and the carrying vessel 2, which is viewed from the right hand side of FIG. 1. The link chain 1 comprises an outer link chain 1a and an inner link chain 1b, each comprising vertical and horizontal links 10 and 11. The outer link chain is positioned horizontally outside. The carrying vessel 2 has an arm at its four corners which functions as a connector to the link chain. The two arms on the front side are a front arms 30 to be connected with the inner link chain 1b, respectively, while the other arms are a rear arms 31 to be connected with the outer link chain 1a, respectively. The rear arm 31 extends over the inner link chain 1b for the connection with the outer chain 1a. The connecting structures of the link chain 1 to the front and rear arms 30 and 31 are set forth hereinafter. It should be noted here that in the present embodiment, the link chain 1 is connected at the upper portion of the vertical link 10 with the front and rear arms 30 and 31 for the sake of mechanical strength.

In the structure of the link chain 1 and the carrying vessel 2 as mentioned above, the wheels are engaged with the link chain 1 from above or from below. Specifically, the upper tandem wheel 4, driving coaxial wheel 5 driven by the motor 50, the lower corner coaxial wheel 7 and the return coxial wheel 8 are engaged with the link chain 1 and the carrying vessel 2 from below, while the lower tandem wheel 3 and the upper corner coaxial wheel 6 are engaged with the link chain 1 and the carrying vessel 2 from above.

When the wheels are engaged with the link chain 1 and the carrying vessel 2 from above, the wheels are inclined to interfere with the front and rear arms 30 and 31, so that some measurement is required in the structures. In the lower tandem wheel 3, since the rear arm 31 goes up before it comes to the position of the inner lower tandem wheel 3b, the front arm 30 can be connected with a side of the link chain 1b to avoid the interference between the front arm 30 and the inner wheel 3b. On the other hand, i the upper corner coaxial wheel 6, since the outer wheel 6a and the inner wheel 6b are coaxially arranged, a structure to clear at least the rear arm 31 is required for the inner wheel 6b.

In a conventional structure, the inner 6b has a notch to clear the rear arm 31. With this structure having the notch, however, the link chain 1 must be adjusted in position so that the rear arm 31 comes into the notch. This is an adjustment operation which requires a lot of manpower, which is shortcoming of the structure. In addition, the provision of the notch reduces mechanical strength of the portion and is subject to stress concentration and so on, and therefore not desirable for mechanical strength.

Figure 3A:
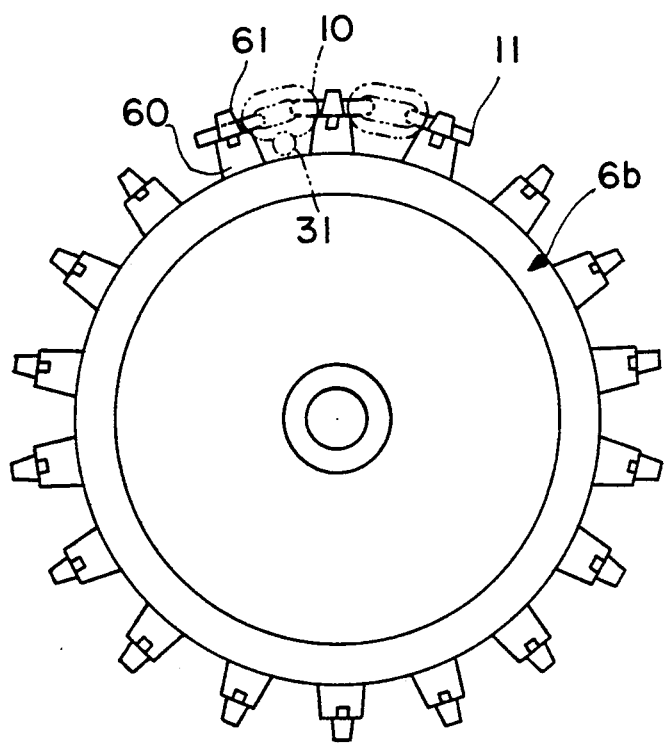
FIG. 3(A) is an explanatory side elevational view of an upper corner coaxial wheel used in the present invention.
Figure 3B:
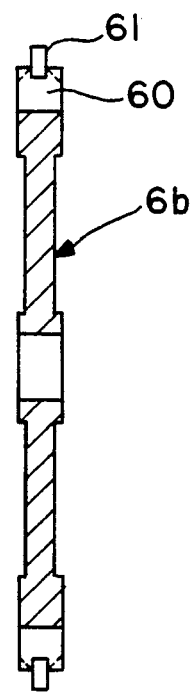
FIG. 3(B) is a cross sectional view of the wheel of FIG. 3(A).

FIG. 3 shows an embodiment of the inner upper corner coaxial wheel 6b of the present invention. The wheel 6b has bases 60 with a predetermined pitch therebetween around the wheel main body, and a tooth is mounted onto each base. The base is made higher than the maximum height of the rear arm 31, so that the rear arm 31 is completely accommodated between the adjacent bases 60.

In the structure mentioned above, the rear arm 31 can be accommodated between the adjacent teeth throughout around the wheel, so that there is no need for position adjustment for engaging the link chain 1 with the inner wheel 6b, causing no interference between the rear arm 31 and the inner wheel 6b whatever engagement is made therebetween. Thus, smooth operation is assured. In addition, it has a balanced strength and desirable for mechanical strength when compared with the structure having the notch. Further, since the base 60 and the tooth 61 are mounted on the wheel main body, the precision of the wheel is improved, and the production is easier in present structure than in the conventional one having the notch.

In the present structure, it is possible to connect the front arm 30 to the link chain 1 at its upper portion. In this embodiment, the rear arm 31 is connected with the vertical link 10 of the link chain 1 at its upper portion by providing substantially the same wheel structure in the outer upper corner coaxial wheel 6a as the previous one so as to clear the connecting portion of the rear arm 31.

The lower tandem wheels 3a and 3b and the driving coaxial wheel 5 have a similar structure as shown in FIG. 3.

There is another improvement in the present invention due to the use of the link chain 1. Specifically, the alternative arrangement of the vertical link 10 and the horizontal link 11 in the link chain 1 allows the provision of a grooved wheel of special construction for the upper tandem wheel 4, the lower corner coaxial wheel 7 and the return coaxial wheel 8, which is hereinafter detailed on the upper tandem wheel 4 with reference to FIGS. 4 and 5.

The upper tandem wheel 4 has a groove 40 formed generally on the circumferential peripheral surface at its axial center, into which the vertical link 10 of the link chain 1 can be inserted with the horizontal link 11 in contact with the peripheral surface, specifically the contact surface portion 42. In such an arrangement, the link chain 1 goes around. It will be noted that with the groove 40, the link chain 1 correctly turns around the upper tandem wheel 4 and can be prevented from dropping out. The wheel may be provided with a side wall 41 on the outer side thereof to completely prevent the link chain from dropping out.

Figure 6:
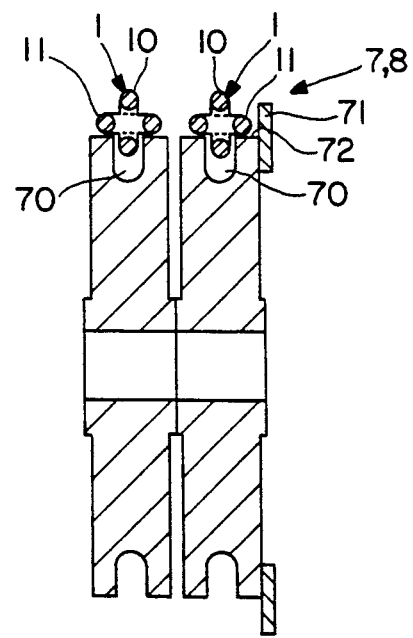
FIG. 6 is a cross sectional view of a lower corner coaxial wheel used in the present invention.

The grooved wheel for the lower corner coaxial wheel 7 and the return coaxial wheel 8 is shown in FIG. 6 which is specifically a cross sectional view of the lower corner coaxial wheel 7. In this structure, the two lower corner coaxial wheel 7 are coaxially connected to each other at their main bodies, and a side wall 71 is provided on the outermost side. The vertical link 10 is inserted into the groove 70, and the horizontal link 11 comes into contact with the contact surface 72 thereof.

The wheel as mentioned above can be more easily produced at a lower cost than the sprocket wheel having teeth. The wheel without tooth can accommodate elongation of the link chain and makes the assembling of the link chain 1 easier and eliminates the necessity of the centering etc. The horizontal link 11 comes uniformly into contact with the contact surface portion 42, which contributes to the longer life of the wheel.

The grooved wheel may be adopted in correspondence with conditions such as the amount of load thereon. For example, if the load on the upper tandem wheel 4 is large, the usual toothed sprocket instead of the grooved wheel can be used for the upper tandem wheel 4.

Provided on the return coaxial wheel 8 in the embodiment of FIG. 1 is an automatic tension device 80 which provides tension adjustment in the link chain 1 through the horizontal movement of the wheel 8. The automatic tension device 80 has a tension sensor to automatically control the tension at a desired level.

Now the structure for connecting the carrying vessel 2 to the link chain 1 is set forth hereinafter with reference to an enlarged side elevation view of FIG. 7, a front cross sectional view of FIG. 8 and a partial top plan view of FIG. 9.

The carrying vessel 2 is provided with a pair of the front arms 30 at its leading portion and a pair of the rear arms 31 at a trailing portion, and the vessel 2 is connected with the link chains 1a and 1b through the front and rear arms 30 and 31. Specifically as illustrated in FIG. 9, the front arms 30 and the rear arms 31 are connected to the inner link chain 1b and the outer link chain 1a, respectively.

Provided on the vertical link 10 of each of the link chains 1a and 1b e.g. by welding at the front and rear portions of the vessel are cylindrical fittings 32 to which the front and rear arms 30 and 31 are connected.

The front arm 30 has a fitting portion 300 to be coupled with the fitting 32, an arm 301 to support the fitting portion 300 and a rotary shaft 302 to rotatably connected them to the carrying vessel 2. The rotary shaft 302 is rotatably fitted into the bearing 303 provided on the bottom of the carrying vessel 2. The fitting portion 300 is formed with female thread, and the fitting 32 and the fitting portion 300 abutted to each other receive a clamp bolt 33 inserted thereinto. The bolt 33 is screwed into the fitting portion 300 and prevented from further rotation by a stop pin 34, thereby connecting the fitting 32 to the fitting portion 300.

The rear arm 31 in a similar structure has a fitting portion 310, an arm 311, and a rotary shaft 312. The last one is rotatably fitted into a bearing 313 formed in the bottom of the carrying vessel 2. The rear arm 31 extends over the link chain 1b, and therefore has a reduced portion 314 to clear the link chain 1b, thereby reducing the upward extension of the assembly.

Since only the clamp bolt 33 and the stop pin 34 are used for connection in the structure as mentioned above, it is easy to connect and disconnect the carrying vessel 2 to the link chain 1. In addition, since the fitting 32 is secured to the vertical link 10 of the link chain 1, and the carrying vessel 2 comes onto the vertical link 10 for connection, the connection work is easy. Further, there is no need for a larger space between the carrying vessel 2 and the link chain 1, and between the link chain 1a and 1b, which contributes the totally compact assembly.

The use of the connection structure as mentioned above is realized through the use of sprocket wheel structure as shown on FIG. 3 for the upper corner coaxial wheel 6 on the outer and inner sides. The height of the base 60 can accommodate the fitting formed on the link chain 1.

The embodiment has the carrying vessel 2 of a special structure so as to prevent an item to be carried such as bulk from dropping and easily clean the adhered substance therein, which is hereinafter set forth with reference to FIGS. 7 to 10.

The carrying vessel 2 comprises a bottom plate 20 and extension end 21. The bottom plate 20 is formed in a concave shape starting from the leading end 20f, which is a tip end in the advancing direction of the vessel as shown by the arrow, descending to form a downwardly convex smooth curve, and rising to a trailing end 20r at the same level as the leading end 20f, thus forming a recessed bottom of the vessel. Integrally formed on the bottom plate at the trailing end 20r is an extension end 21 which forms a upwardly convex curve from the trailing end 20r as a transition point and ends at a rear end portion 21r. The side plate 22 has a shape conforming to the bottom plate 20 and the extension 21, and the extension 21 generally forms a shape of beak.

The carrying vessels are arranged such that the extension end 21 of the preceding vessel 2 overlaps from above the leading end 20f of the next following carrying vessel 2 on the horizontal conveyor portions B and C. A flange 23 receives the roller.

Since the extension end 21 is arranged to overlap the leading end 20f of the bottom plate, the wheel comes into contact with the carrying vessel 2 from above as in the case of the upper corner coaxial wheel 6, and at the portion where the carrying vessels successively turn upward, the extension end 21 may collide with the leading end 20f depending on the turning angle. In order to avoid this, in the present embodiment, the upper corner coaxial wheel 6 has a larger radius than, specifically twice as large as those of the driving coaxial wheel 5, the lower corner coaxial wheel 7 and so on, thereby providing a smaller curvature and a larger turning angle.

In the structure as mentioned above, the item to be carried such as bulk, when dropped from the carrying vessel 2 continuously moving in a horizontal direction, is prevented from dropping through a gap between the carrying vessel 2 without causing no interference on operation by the fact that the extension 21 overlaps the leading end 20f.

When the substance adhered to the inner surface of the carrying vessel 2 is scraped during running in the horizontal direction, the continuity from the bottom plate 20 to the following bottom plate 20 through the extension 21 contributes a simple and positive cleaning operation. The cleaning is automated in the present invention, which is set forth hereinafter with reference to FIG. 10.

The cleaner means 9 is positioned in a location where the driving coaxial wheel 5 causes the carrying vessel 2 to turn into the inversed attitude. The cleaner means 9 comprises a scraper of hook shape rotatably supported at a fulcrum 92, a spring 91 for pulling the scraper upwards and a receiving roller 93 for supporting the vessel 2 at the bottom portion to receive the upward pulling force. In the scraper 90 is always pulled by the spring 91, the tip end of the scraper 90 is always in contact with the bottom plate 20 due to the continuity of the bottom plate 20 of the carrying vessel 2 at the extension end 21, thereby scraping off the adhered substance for the automatic cleaning of the carrying vessel 2. It can be said that the structure of the cleaner 9 is first realized by the carrying vessel 2 of the embodiment.

In the previous embodiment, the toothed sprocket wheel is used only in the lower tandem coaxial wheel 3, the driving coaxial wheel 5 and the upper corner coaxial wheel 6 with the grooved wheel with no tooth used in the upper tandem wheel 4, the lower corner coaxial wheel 7 and the return coaxial wheel 8, so that upon mounting the link chain 1, its teeth are engaged only with those of the lower tandem wheel 3, the driving coaxial wheel 5 and the upper corner coaxial wheel 6. The upper corner coaxial wheel 6 with the bases 60 having no notch requires no centering and allows the very easy turning process of the link chain 1 around the wheel. Accordingly, the continuous conveyor apparatus can be easily installed and disassembled in a short time.

The link chain has a longer life and a shorter pitch, which leads to the compact wheel which can be produced generally light in weight and at a lower cost. In addition, the use of the grooved wheel for the upper tandem wheel 4, the lower corner coaxial wheel 7, and the return coaxial wheel 8 can further reduce the cost.

Now another embodiment of the present conveyor apparatus has an inlet and an outlet facing on a single direction to generally form a C-shape side, which is used in unloading of bulk from a freighter.

Figure 11:
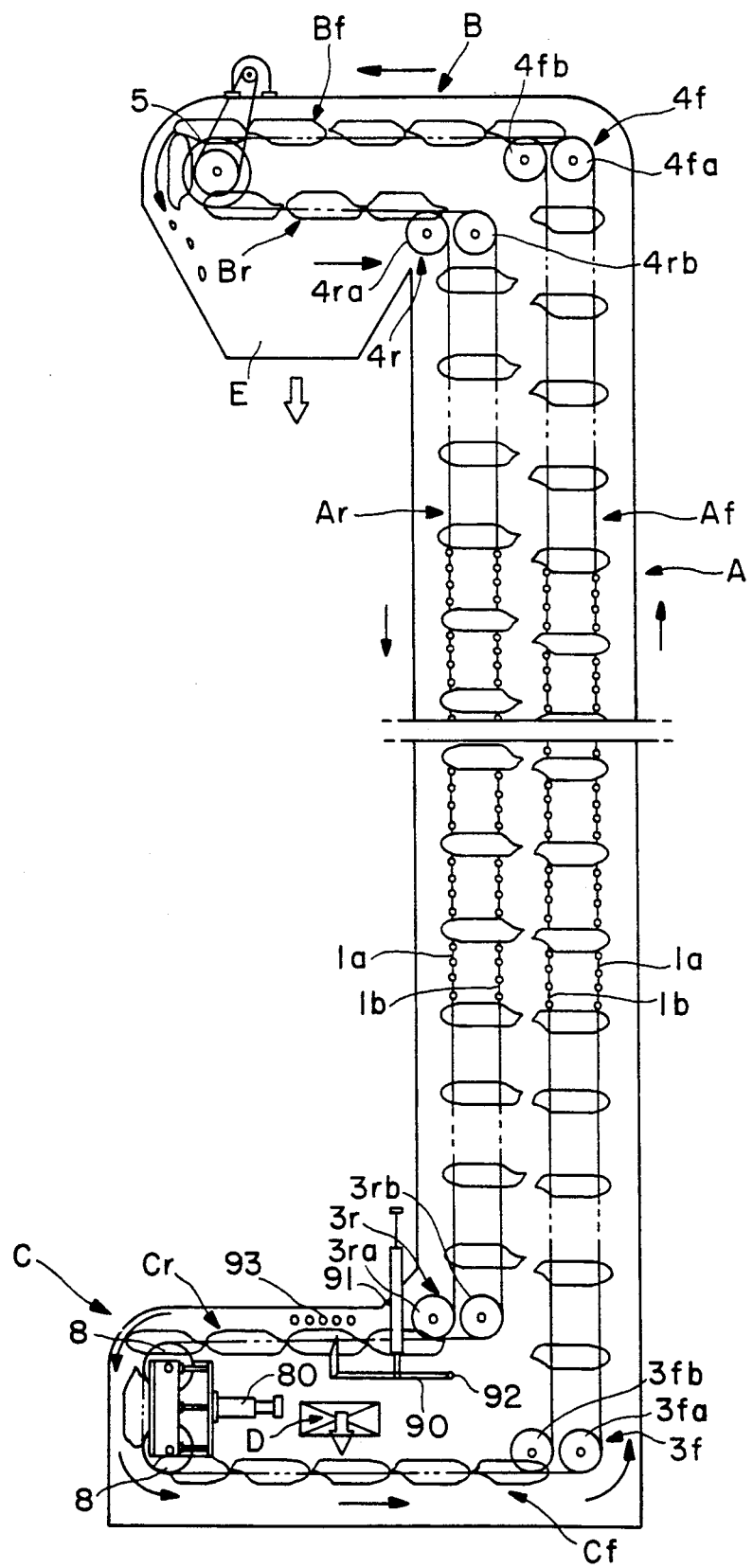
FIG. 11 is a side elevational view of one embodiment of the C-shaped continuous conveyor apparatus of the present invention.

FIG. 11 illustrates a side elevational view of the apparatus. The continuous conveyor apparatus comprises a vertical conveyor section A, a lower horizontal conveyor section C, an upper horizontal conveyor section B, the lower horizontal conveyor section C and the upper horizontal conveyor section B being extending in a single direction from the vertical conveyor section A to form a C shaped configuration.

The vertical conveyor section A comprises a vertical advance passage or path Af for moving the carrying vessel 2 upward and a vertical return passage or path Ar for moving the carrying vessel 2 downward. The upper horizontal conveyor section B comprises an upper horizontal advance passage Bf connected to the vertical advance passage Af to horizontally move the carrying vessel 2 in a left direction in the drawing and an upper horizontal return passage Br provided below the upper horizontal advance passage and connected to the vertical return passage Ar for horizontally moving the carrying vessel in a right direction in the drawing. The lower horizontal conveyor section C comprises a lower horizontal return passage Cr connected to the vertical return passage Ar for horizontally transferring the carrying vessel 2 in a left direction and a lower horizontal return passage Cf provided below the lower horizontal return passage Cr and connected to the vertical advance passage Af for horizontally transferring the carrying vessel 2 in a right direction in the drawing. The item to be carried is loaded at the lower horizontal advanced passage Cf from an infeed port D, and discharged at an upper horizontal return passage Br from a discharge port E.

The tandem wheels and the coaxial wheels are positioned at each bent portion in place. Specifically, the lower tandem wheels 3f and 3r and the upper tandem wheels 4f and 4r and the driving coaxial wheel 5 and the return coaxial wheel 8 are placed in position, around which four endless link chains 1 are turned. The outer side and inner side of the tandem wheel are designated by "a" and "b", respectively. The tandem wheel at least at the right hand side is of a cantilever shape and has no shaft at the center thereof to move the carrying vessel through the wheel.

The carrying vessel 2 has four corners to which the link chain 1 is connected. At the vertical advance passage Af, the link chain 1a is connected to the right side of the vessel 2 while the link chain 1b is connected to the left side of the vessel 2.

The carrying vessel 2 is horizontally transferred at the lower horizontal passage Cf in a normal attitude with the opening faced upward and receives the item to be carried from the infeed port D, and then moves in the right direction in the drawing, and turns in a vertical direction at the lower tandem wheel 3f into the vertical advance passage Af. The carrying vessel 2 moves upward in the normal horizontal attitude upward through the vertical advance passage Af, changes the travelling direction at the upper tandem wheel 4f in the left direction in the drawing into the upper horizontal advance passage Bf. The carrying vessel 2 horizontally moves in the normal attitude through the upper horizontal passage Br, change the travelling direction and the attitude around the driving coaxial wheel 5, throws away its content and moves into the upper horizontal return passage Br. The content, that is the item to be carried is discharged from the discharge port E. The carrying vessel 2 is horizontally transferred in the right direction in the inversed attitude with its opening faced downward through the upper horizontal return passage Br, changes the travelling direction around the upper tandem wheel 4r into the vertical return passage Ar. The carrying vessel 2 moves down in the inversed attitude and change the travelling direction around the tandem wheel 3r again in the left direction in the drawing into the lower horizontal return passage Cr. The carrying vessel 2 horizontally moves in the inversed attitude through the lower return passage Cr, and changes the travelling direction and the attitude around the return coaxial wheel 8 into the lower horizontal advanced passage Cf. The carrying vessel 2 is horizontally transferred in the normal attitude through the lower horizontal advance passage Cf as mentioned previously and supplied with the item to be carried at the infeed port D, and thus the operation is repeated.

The joint portions between the link chain 1 and the arms 30 and 31 of the carrying vessel 2 change vertically in location through operation in the C-shaped continuous conveyor apparatus, which is explained hereonafter with reference to the tandem wheel and the coaxial wheel.

In FIGS. 12 and 13, the link chain 1 and the arms 30 and 31 are interconnected with each other in the lower horizontal advance passage Cf. The rear arm, which is referred to as outer arm 31' hereinafter, is apparently located in a front portion of the carrying vessel 2, while the front arm, which is referred to as inner arm 30' hereinafter, is located in a rear portion of the vessel 2. The outer arm 31' extends under the inner chain 1b so as to be connected with the outer chain 1a on its lower side. The inner arm 30' is also connected to the inner chain 1b on its lower side. The remained joint structure is substantially the same as those of FIGS. 7 and 8, wherein the fitting 32 is rotated relative to the clamp bolt 33 so as to locate the arms 30' and 31' above and below the chain 1, respectively, which is explained hereinafter.

FIGS. 14 to 17 schematically illustrate the lower tandem wheel 3, the upper tandem wheel 4, the link chain 1 and the carrying vessel 2. These are figures when viewed from the right hand side in FIG. 11, and the wheel closer to the viewer in the drawing is daubed in black. In addition, the arms 30' and 31' closer to the viewer are shown by the solid lines and the arms 30' and 31' remote from the viewer are shown by the broken lines in the drawings.

Figure 14:
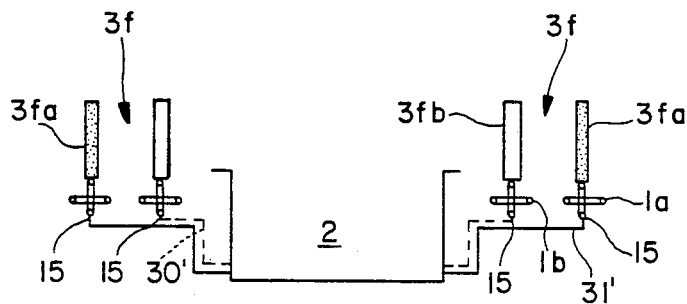
FIG. 14 to 17 are schematic views to illustrate relations between the link chains and the carrying vessel, respectively.

The link chain as shown in FIG. 14 comprises the outer link chain 1a provided outside in a horizontal or lateral direction and the inner link chain 1b. The carrying vessel 2 has one arm at each of the four corners, which is a joint member to the link chain 1. Provided at a front portion of the vessel is the outer arm 31' for connection with the outer link chain 1a. On the other hand, provided at a rear portion of the vessel is the inner arm 30' for connection with the inner link chain 1b. The outer arm 31' extends under the inner link chain 1b to be connected with the outer link chain 1a at its lower portion. The inner arm 30' is also connected with the inner link chain 1b at its lower portion.

The link chain 1 comes into contact with the lower tandem wheel 3f in the advance passage from below and turns in a vertical travelling direction, and comes into contact with the upper tandem wheel 4f from above the turns again in the horizontal or lateral travelling direction. The inner arm 30' and outer arm 31' rotate relative to the carrying vessel 2 at the upper tandem wheel 4f, and the joint portions 15 between the inner and outer arms 30' and 31' and the link chain 1 are shifted upward.

Figure 4:
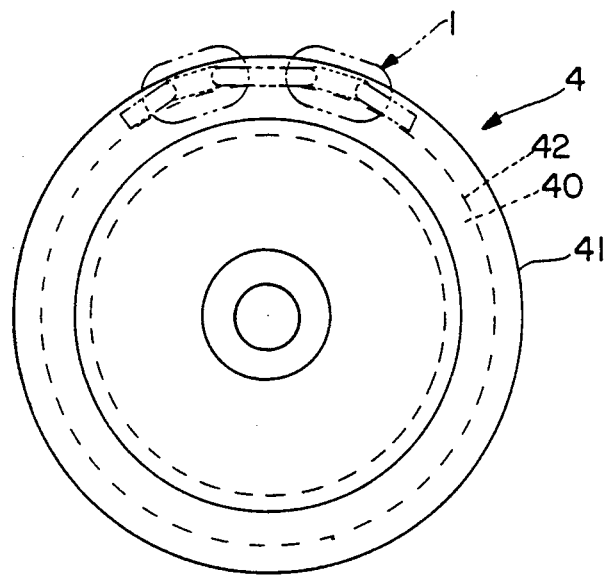
FIG. 4 is a front elevational view of a second upper wheel used in the present invention.
Figure 5:
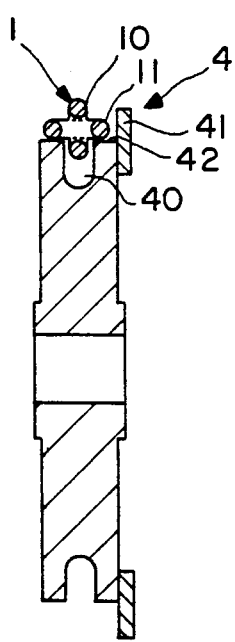
FIG. 5 is a cross sectional view of the second upper wheel of FIG. 4.
Figure 15:
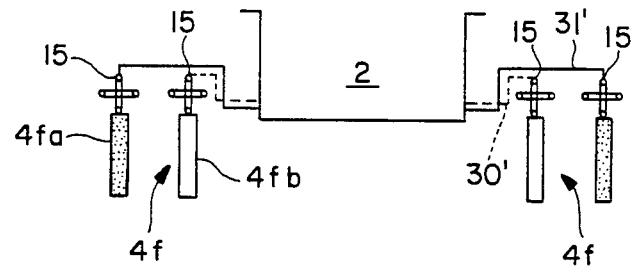
Figure 16:
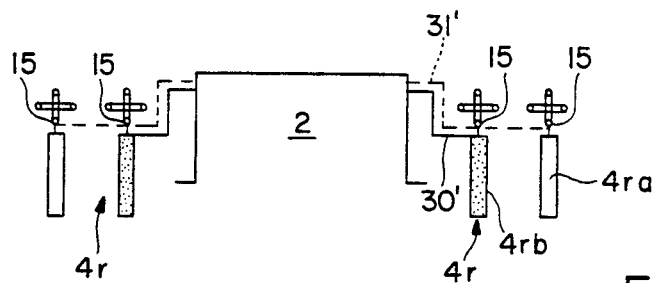

The driving coaxial wheel 5 comes into contact with the link chain 1 from below as in the case shown in FIG. 15, wherein the carrying vessel 2 is turned into an inversed attitude. The front and rear relationship between the inner arm 30' and outer arm 31' is reversed. Specifically the inner arm 30' is located closer to the viewer and the outer arm 31' remote from the viewer. The link chain 1 comes into contact with the upper tandem wheel 4r in the return passage from above as shown in FIG. 4. Since the joint portion 15 between the inner and outer arms 30' and 31' and the link chain 1 are positioned on the wheel side, a sprocket wheel structure as shown in FIG. 3 is used for the upper tandem wheel 4r in the return passage to clear the joint portions 15.

Figure 17:
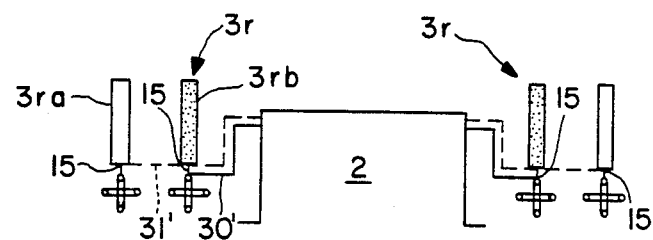

The carrying vessel 2 turns around the upper tandem wheel 4r in the return passage to a vertical direction, and moves downward in the inversed attitude, and turns around the lower tandem wheel 3r in the return passage for direction change. The lower tandem wheel 3r comes into contact with the link chain 1 from above as shown in FIG. 17, where the carrying vessel 2 is directed in the horizontal direction and reversed at the return coaxial wheel 8. A sprocket wheel structure as shown in FIG. 3 is adopted for the lower tandem wheel 3r to clear the joint portions 15 located on the wheel side.

The return coaxial wheel 8 comprises two wheels in the embodiment, but may be a single wheel of larger diameter. The return coaxial wheel 8 comes into contact with the link chain from below as shown in FIG. 17. The conveying vessel 2 returns into the original normal attitude at the return coaxial wheel 8 as shown in FIG. 14.

As previously mentioned, a sprocket wheel structure shown in FIG. 3 is used for the upper tandem wheel 4r and the lower tandem wheel 3r in the return passage and the driving coaxial wheel 5 to clear the joint portions between the inner and outer arms 30' and 31' and the link chain 1.

The lower horizontal return passage Cr is provided with the cleaner 9 to automatically clean substances adhered to the interior of the carrying vessel 2 in this embodiment. The structure is the same as that shown in FIG. 10.

The continuous conveyor system mentioned above is very effective for loading and unloading of bulk as in a freighter because of tis C-shaped structure.

Figure 18:
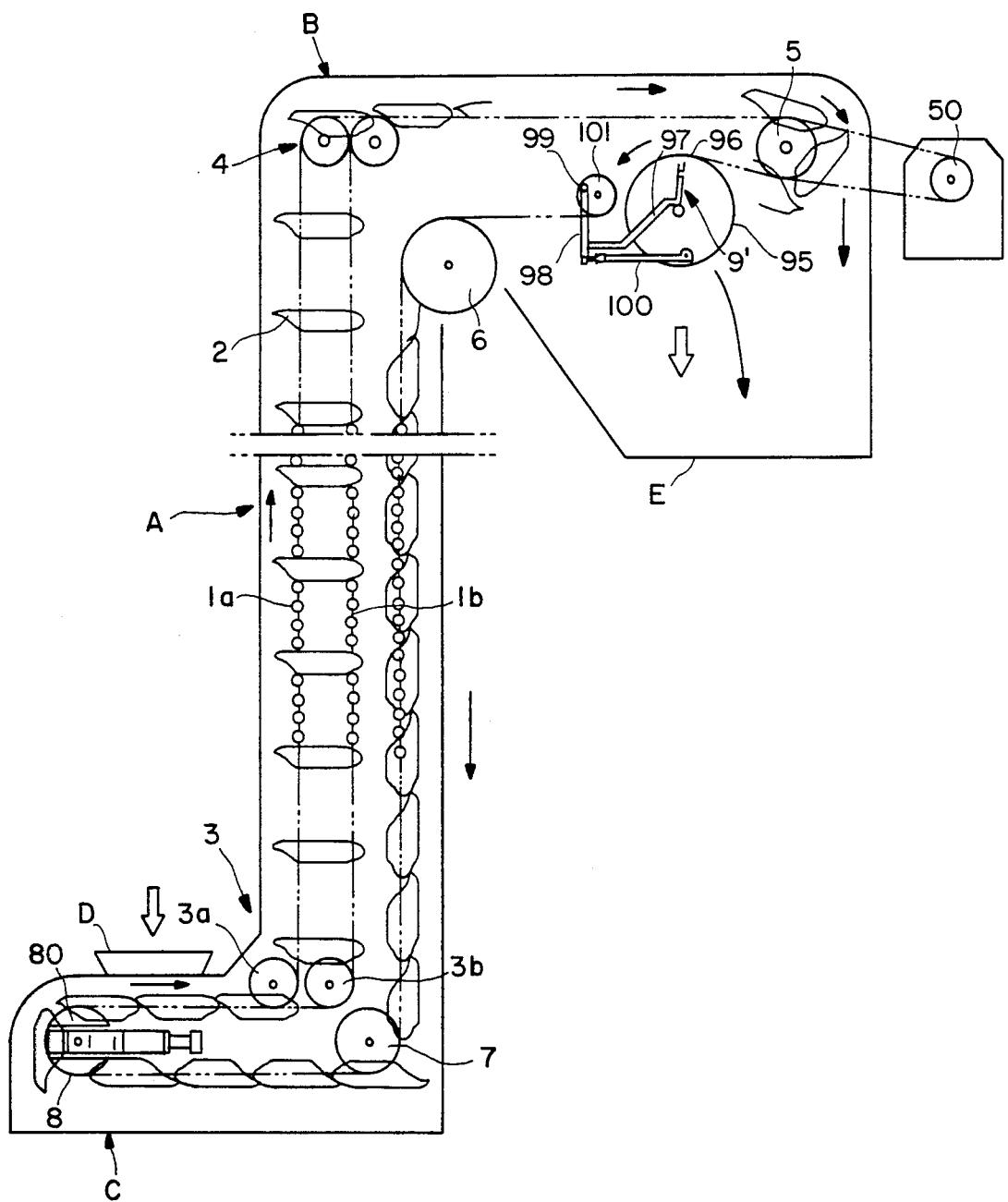
FIG. 18 is a side elevational view, similar to those of FIGS. 1 and 11, showing another embodiment of the continuous conveyor apparatus of the present invention.

Referring now to FIG. 18, the apparatus therein above is similar to that shown in FIG. 1, except for the following modifications. A cleaner 9' is located between the driving coaxial wheel 5 and the upper corner coaxial wheel 6. This location of the cleaner 9' is to keep the upper corner coaxial wheel 6 and the lower part of the conveyor clean. In FIG. 1 where the cleaner 9 is located at the upper corner coaxial wheel 6, mud or the like from the vessel 2 drops on the upper corner coaxial wheel 6 or on the lower corner coaxial wheel 7 and on the lower part of the equipment. When the mud is adhesive material, the mud is piled up on the shaft of the wheel, the bottom of the equipment and so on. The position of cleaner 9' shown in FIG. 18 can cause mud or the like to drop outside of the equipment through the discharge port E. Thus the position of the cleaner 9' is suitable for conveying adhesive material.

Figure 19:
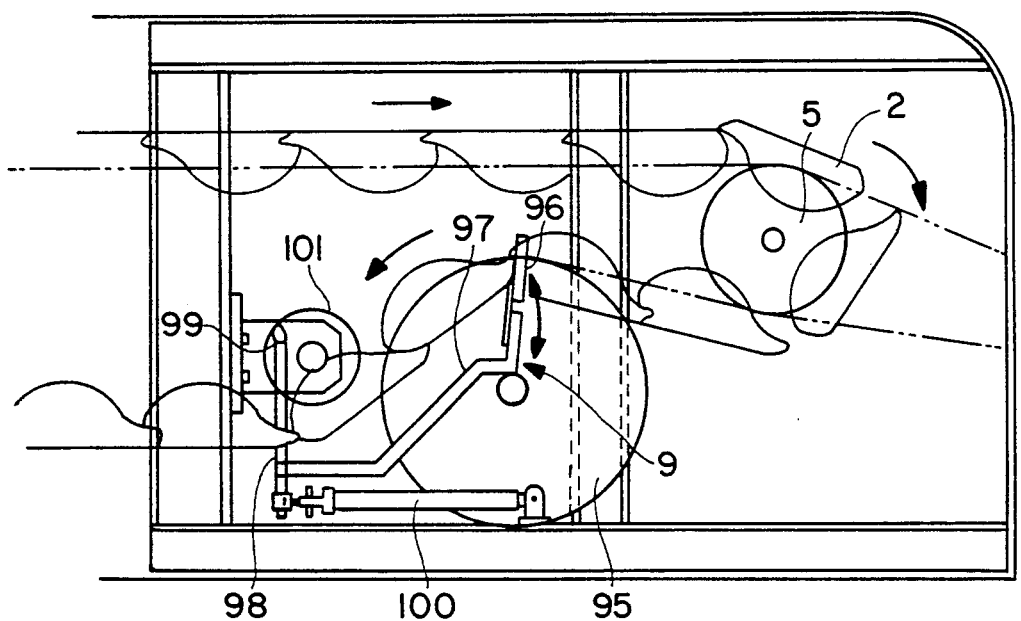
FIG. 19 is an enlarged view, similar to that of FIG. 10, of an upper corner coaxial wheel portion in the present invention.

Referring to FIG. 19, the cleaner 9' includes cleaner wheel means 95, which comprises cantilever wheels so as to avoid piling of mud or the like scraped from the vessels 2 on a shaft of a wheel. The carrying vessels 2 turn slightly in traveling over the wheel 95, and the bottom plate 20 and extension 21 move in a smooth curve corresponding to the art of the cleaner wheel means 95. A restraining roller 101 is provided close to the wheel means 95 to make the vessels 2 move along the wheel means 95. A scraper 96 is provided between the pair of wheels of the cleaner wheel means 95. The scraper 96 is movable in the radial direction of the wheel means 95. The scraper 96 is supported by an arm 97 and a lever 98 which is rotatably mounted on a fulcrum 99. A spring equipment 100 always pulls the level 98 so that the scraper 96 is pushed toward the bottom plate 20 and the extension 21 of the vessels 2. Consequently the top end of the scraper 96 is always in contact with the bottom plate 20 of a vessel 2, thereby scraping off the adhered substance.

Figure 20:
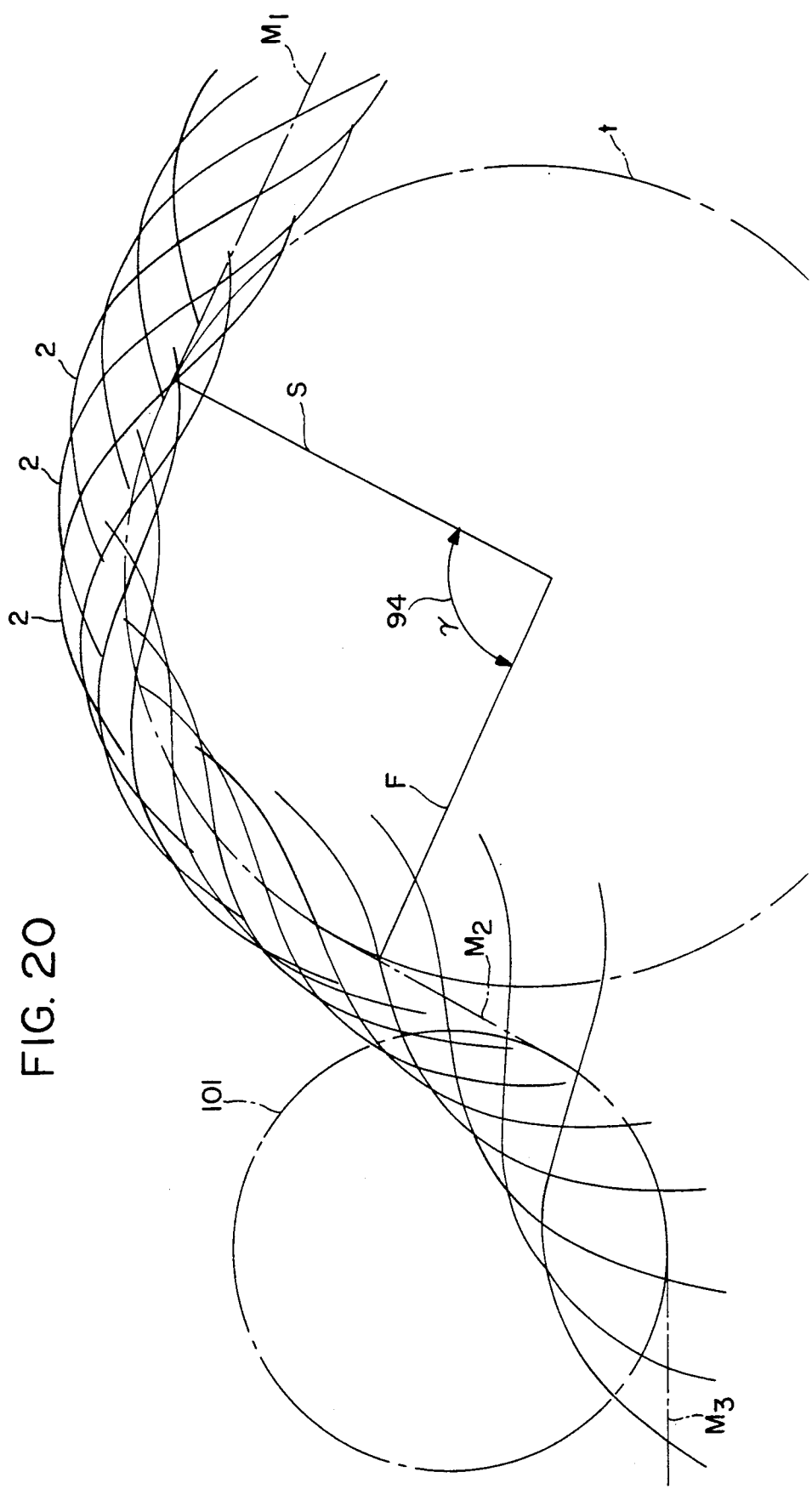
FIG. 20 is a somewhat diagrammatic enlargement of a portion of the view of FIG. 19, showing the movement of the vessels 2 of FIG. 19.

As shown in FIG. 20, the vessels 2 come from the direction of the driving coaxial wheel 5 moving along a line M1 from right to left, keeping an inverted position. The vessel 2 then turn downwardly so as to follow a circular path represented by the line t to which the line M1 is tangent. Thereafter the vessels 2 move on a line M2 which is tangent to the circular path t and then are caused to move almost horizontally on a line M3 by the restraining roller 101 toward the direction of the upper corner coaxial wheel 6. The line t is defined by the curvature of the cleaner wheel means 95. The sector 94 represents that portion of the line t which is followed by the vessels 2, from the point that the line M1 contacts to the line t where the vessel starts to turn, to the point that the vessels leave the line t and move to the line M2. In FIG. 20, the sector 94 is from a turning start line S to a turning finish line F and subtends an angle γ. Sequential positions of a representative vessel 2 are shown in FIG. 20.

Figure 21:
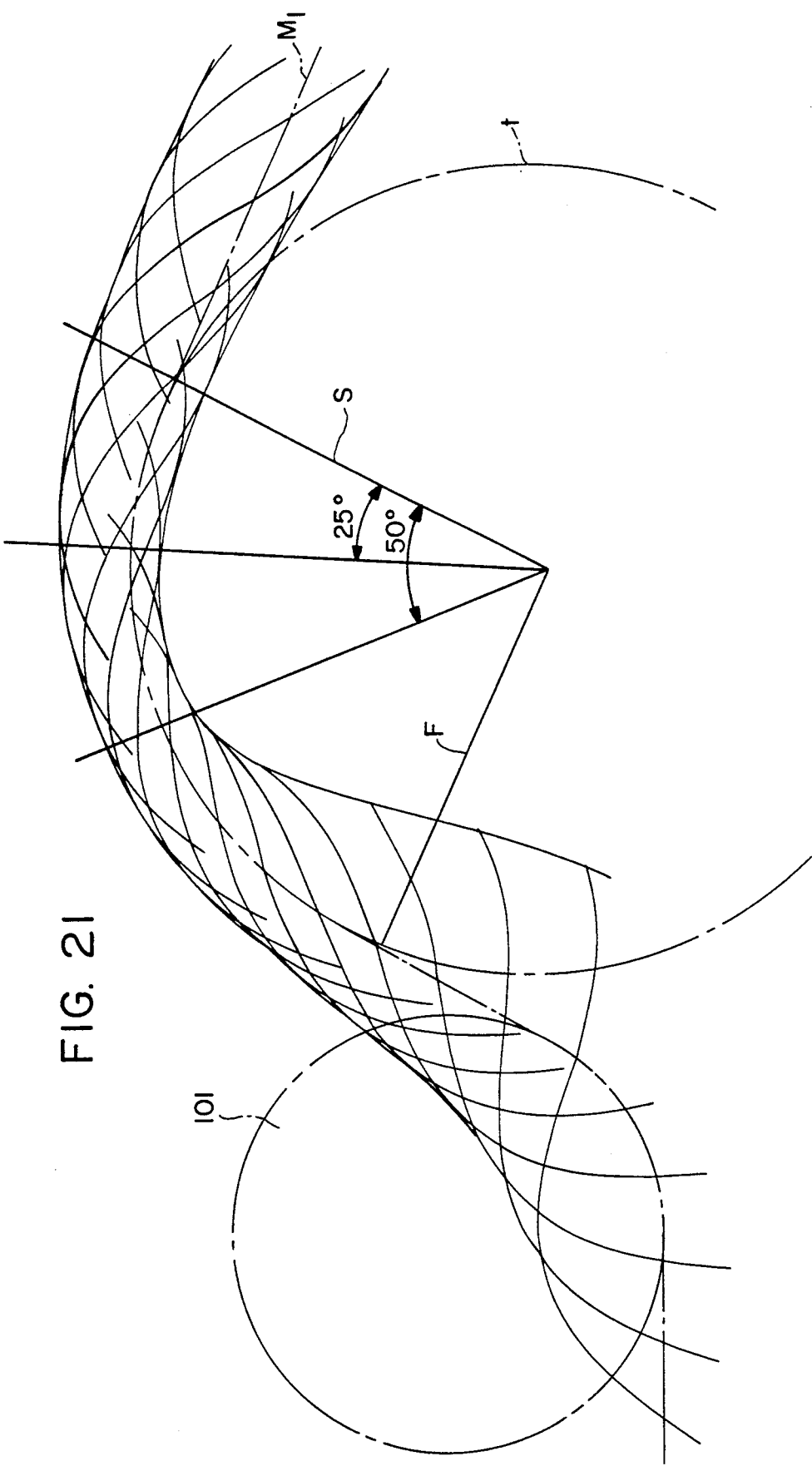
FIG. 21 is a diagrammatic view similar to that of FIG. 20.

The scraper 96 contacts the bottom plate 20 and the extension 21 and scraps the adhered material. The scraper 96 is pushed toward the radial direction by the spring 100 and moves up and down tracing the curve of bottom plate 20 and the extension 21. The stroke of moving up and down of the scraper 96 is small, because the scraper is positioned at that position within the sector 94 at which the vessels 2 are essentially transverse to a radius of the circle t. As shown in FIG. 21, the variation in radial position of the bottom of the vessels 2 is smallest at about 25-50 degrees from the start line S. Consequently the scraper positioned at this part of the sector 94 moves in the smallest stroke of the radial direction, which reduces the noise and the wear of scraper 96 and the vessels 2.

Figure 7:
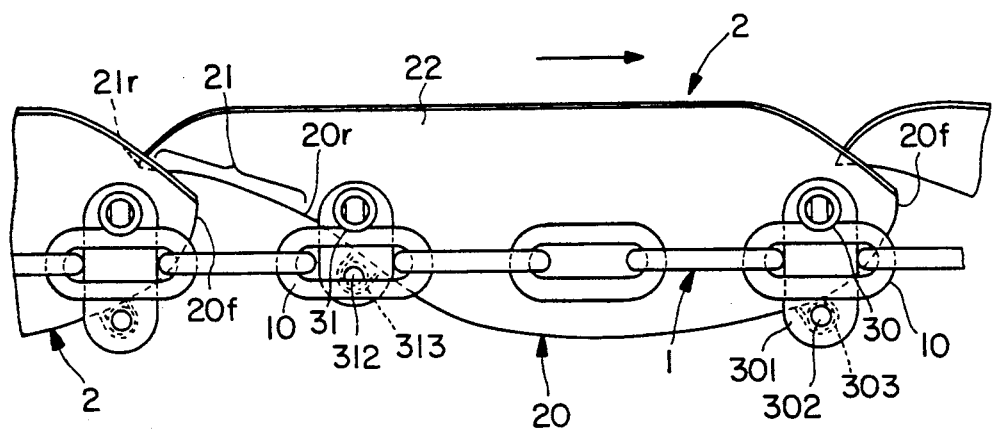
FIG. 7 is an enlarged side elevational view of a joint portion between a carrying vessel and a link chain of the present invention.
Figure 8:
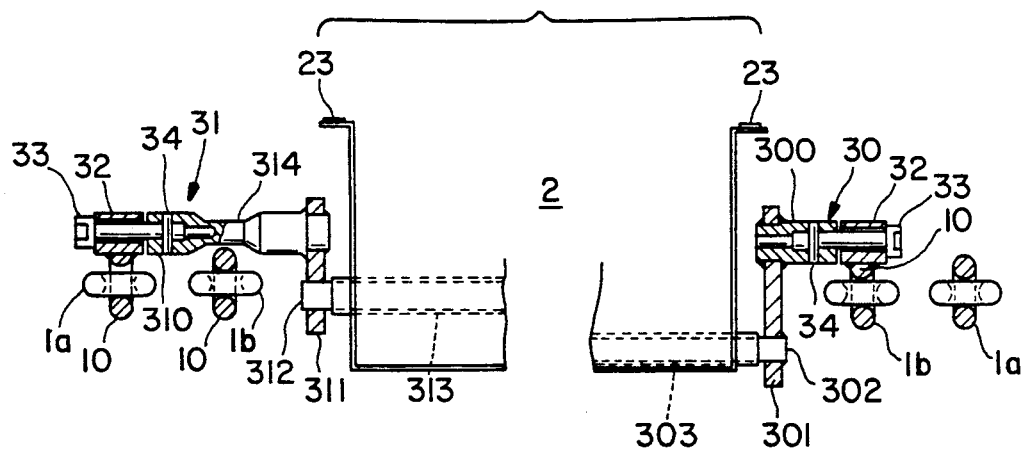
FIG. 8 is a front elevational view in cross section of the joint portion of FIG. 7.
Figure 9:
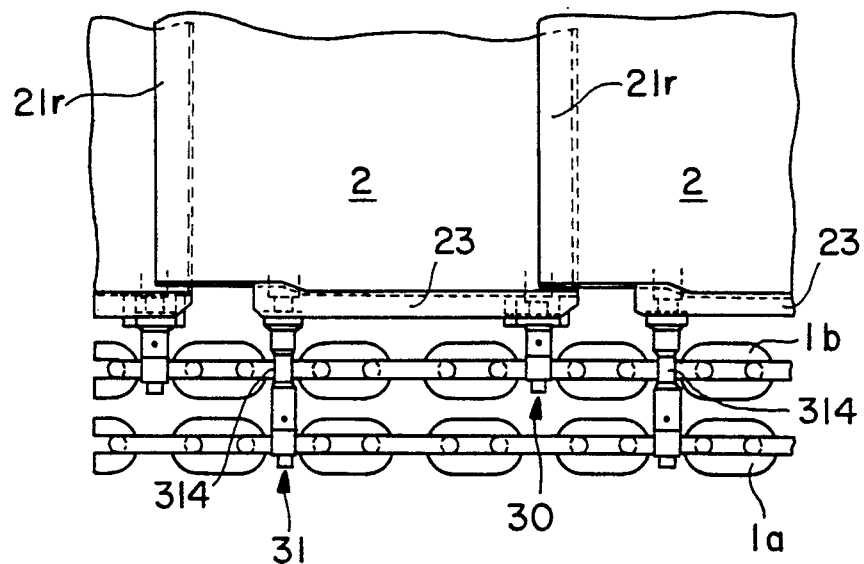
FIG. 9 is a partial top plan view of the joint portion of FIG. 7.
Figure 10:
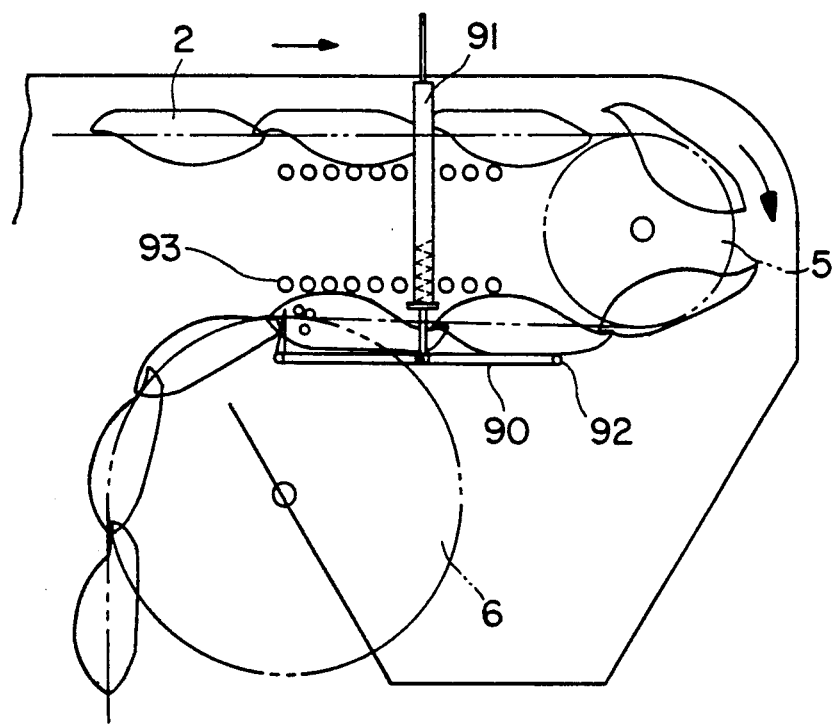
FIG. 10 is an enlarged view of an upper corner coaxial wheel portion in the present invention.
Figure 22:
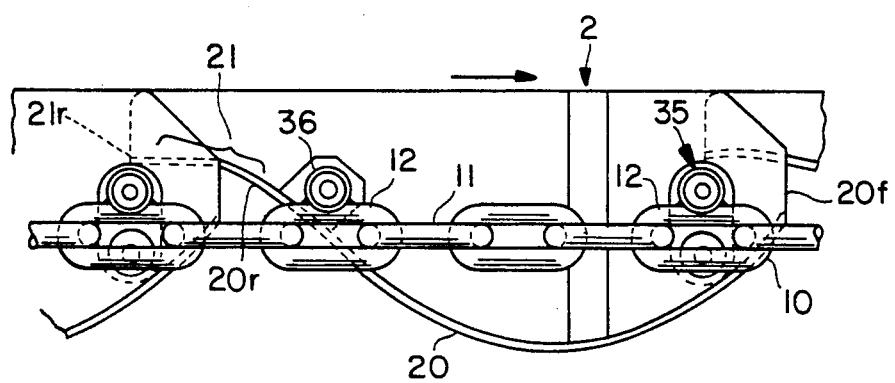
FIG. 22, 23 and 24 are views similar to those of FIGS. 7, 8 and 9, respectively, showing another embodiment for connecting the vessels 2 and the link chains 1.
Figure 23:
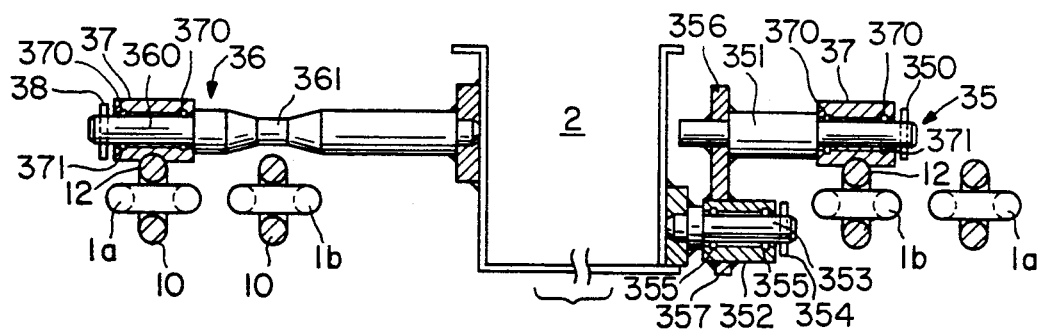
Figure 24:
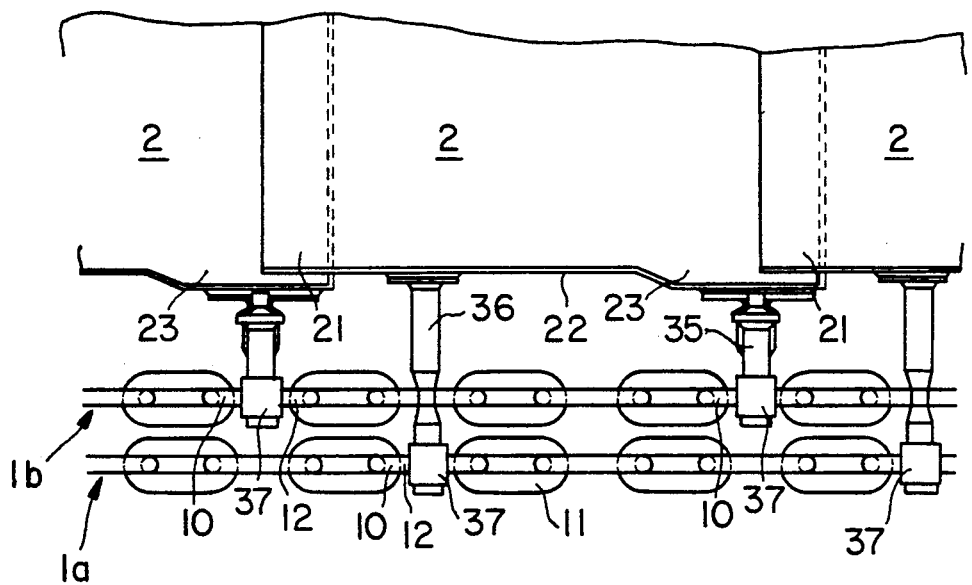

FIGS. 22, 23 and 24 are similar to FIGS. 7, 8 and 9, respectively, and show another embodiment of the connection between the vessels 2 and the link chains 1. A rear arm 36 is a shaft secured on the vessels 2 at the base end. The tip end of the rear arm 36 is an inserting portion 12 of the vertical link 10. The tip end of the inserting portion 360 which is rotatably inserted in a fitting 37. The fitting 37 is cylindrical and mounted on the outer side of the straight portion 360 projects from the fitting 37 and a stop pin 38 is provided therewith. The inside of the fitting 37 is provided with a dry bush 371 and O rings 370 for keeping the inside of the fitting 37 clean from dust, mud or the like, which provides frequent and reliable rotation of the inserting portion 360. A reduced portion 361 is formed on the rear arm 36 to accommodate the link chain 1b.

The tip end of a front arm 35 is an inserting portion 350 which is rotatably inserted in another fitting 37. The tip end of the inserting portion 350 projects from the fitting 37 and a stop pin 38 is provided therewith. The inside of the fitting 37 is provided with a dry bush 371 and O rings 370 for keeping the inside of the fitting 37 clean from dust, mud or the like.

The front arm 35 is rotatably connected to the vessels 2. A rotatable shaft 351 is mounted on a rotary plate 356 which is rotatably connected to a shaft 353 secured on the side of the vessels 2. The shaft 353 is covered by a cylindrical tube 352 which is rotatable around the shaft 353 by a dry bush 357. The rotary plate 356 is secured on the rotatable tube 352. O rings 355 are mounted at the inside of the rotatable tube 352 to seal the rotatable tube 352 and the shaft 353 from dust, mud or the like. 354 indicates at stop pin.

In the embodiment shown in FIGS. 22, 23 and 24, it is easy to connect the vessels 2 to the link chains merely by inserting the inserting portion 350 and the inserting portion 360 into the fitting 37 and by engaging the stop pin 38.

Figure 25:
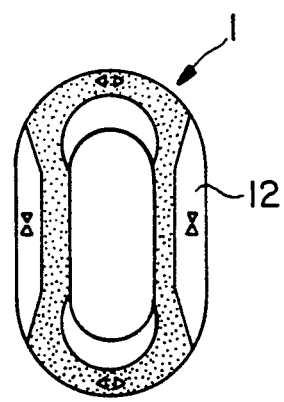
FIG. 25 is a diagram showing stresses which arise in a single link when the chain 1 is stretched.

The fitting 37 is mounted on the outer side of the straight portion 12 of the vertical link 10 to suppress reduction of strength of the link chains due to mounting the fitting 37 and to make it easy to connect the vessels 2 with the link chains, FIG. 25 shows the stress pattern in the link chain 1 when the chain 1 is stretched. The white portion designates the portion where compressive stress arises and the black portion designates the portion where tensile stress arises. Because the outer side of the straight portion 12 is the portion of compressive stress, there is no reduction of strength due to mounting the fitting 37 thereon. Furthermore, the outer side of the straight portion 12 is exposed at the top end of the equipment as shown in FIG. 24; therefore it is easy to mount the front arm 35 or the rear arm 36 to the vertical link 10.

Figure 26A:
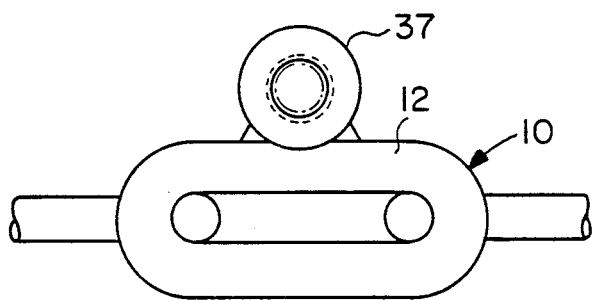
FIGS. 26(A) and (B), 27(A) and (B) and 28(A) and (B) are detail views, showing variations of the connections between the fitting 37 and the vertical link 10.
Figure 26B:
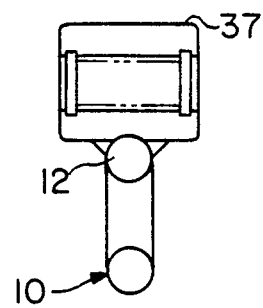
Figure 27A:
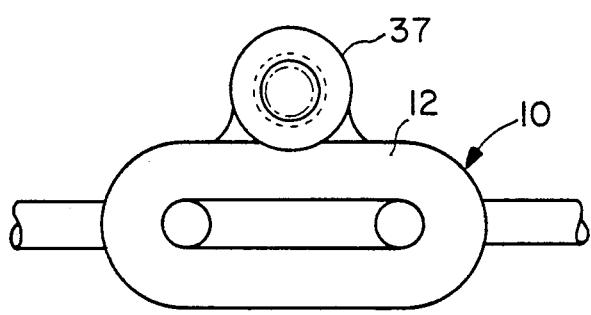
Figure 27B:
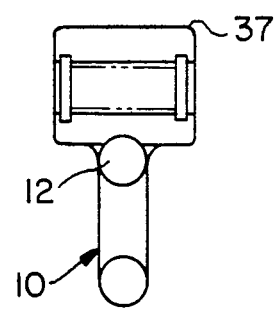
Figure 28A:
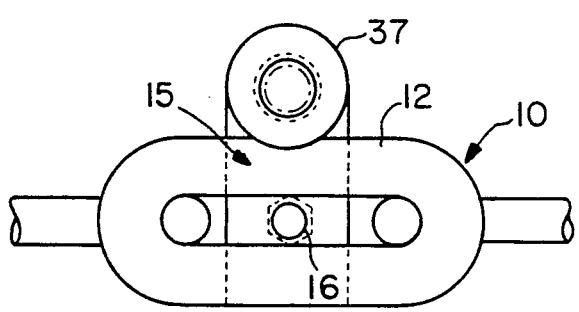
Figure 28B:
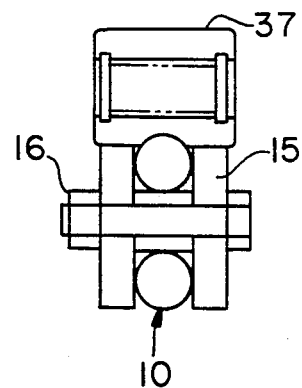

FIGS. 26(A) and (B), 27(A) and (B) and 28(A) and (B) show variations of the connections between the fitting 37 and the vertical link 10. In FIGS. 26(A) and (B), the fitting 37 is secured on the outer side of the straight portion 12 by welding, and in FIGS. 27(A) and (B) the fitting 37 is formed integrally with the vertical link 10 by forging. In FIGS. 28(A) and (B) the fitting 37 is provided with support plates 15 which receive the vertical link 10 therebetween. Bolt and nut 16 fastens the support plates 15 against the vertical link 10. With such a construction as shown in FIGS. 28(A) and (B), the fitting 37 can be mounted on the desired vertical link 10.

Having thus described the principles of the invention together with illustrative embodiments thereof, it is to be understood that although specific terms are employed they are used in a generic and descriptive sense and not for purposes of limitation, the scope of the invention being set forth in the following claims.

I claim:

1. A continuous conveyor apparatus having at least one zone or horizontal movement and at least one zone of vertical movement, comprising, in combination, a pair of inner link chains and a pair of outer link chains, a plurality of carrying vessels each having a front end and a rear end, front connecting means mounting the front ends of said carrying vessels between said inner link chains, rear connecting means mounting the rear ends of said carrying vessels between said outer link chains, said chains being mounted upon a plurality of tandem wheel means and coaxial wheel means in such a manner that at least one tandem wheel means is mounted at the junction between a horizontal zone and a vertical zone; each said tandem wheel comprising a pair of inner wheels each wheel mounted in cantilever on an inner shaft, said inner shafts being coaxially aligned, a pair of out wheels each wheel mounted in cantilever on an outer shaft, said outer shafts being coaxially aligned with each other and horizontally aligned with and spaced from said inner shafts, each said coaxial wheel means comprising a pair of inner wheels and a pair of outer wheels all mounted on a common shaft, said link chains being of simple construction, through which lubricant generally sufficiently penetrates to provide better abrasion resistance than roller chains, and adapted to high speed, compactness, and twisting in three dimensions, each of said link chains comprising an endless sequence of alternating vertical links and horizontal links, said front connecting means and said rear connecting means each being connected with the outer side of the straight portion of a vertical link, such wheels of said coaxial and tandem wheels that are engaged with the link chain from above having teeth having a space and height therebetween to receive the connecting means, wherein said coaxial and tandem wheel means have a grooved wheel in place having a circumferential groove for receiving a vertical link of said link chain therein.

2. A continuous conveyor apparatus having at least one zone or horizontal movement and at least one zone of vertical movement, comprising, in combination, a pair of inner link chains and a pair of outer link chains, a plurality of carrying vessels each having a front end and a rear end, front connecting means mounting the front ends of said carrying vessels between said inner link chains, rear connecting means mounting the rear ends of said carrying vessels between said outer link chains, said chains being mounted upon a plurality of tandem wheel means and coaxial wheel means in such a manner that at least one tandem wheel means is mounted at the junction between a horizontal zone and a vertical zone; each said tandem wheel comprising a pair of inner walls each wheel mounted is cantilever on an inner shaft, said inner shafts being coaxially aligned, a pair of outer wheels each wheel mounted in cantilever on an outer shaft, said outer shafts being coaxially aligned with each other and horizontally aligned with and spaced from said inner shafts, each said coaxial wheel means comprising a pair of inner wheels and a pair of outer wheels all mounted on a common shaft, said link chains being of simple construction, through which lubricant generally sufficiently penetrates to provide better abrasion resistance than roller chains, and adapted to high speed, compactness, and twisting in three dimensions, each of said link chains comprising an endless sequence of alternating vertical links and horizontal links, said front connecting means and said rear connecting means each being connected with the outer side of the straight portion of a vertical link, such wheels of said coaxial and tandem wheels that are engaged with the link chain from above having teeth having a space and height therebetween to receive the connecting means, wherein said inner and outer wheels of the coaxial wheel means and said wheels of the tandem wheel means, which are engaged with the link chain from above, are sprocket wheels each comprising a main body, base provided around said main body and spaced apart with a predetermined pitch sufficient to provide a gap to accommodate the width of said connecting mean and having a height sufficient to receive said connecting means between said bases, and teeth each mounted on said bases and engaged with a horizontal link of said link chain.

3. A continuous conveyor apparatus having at least one zone or horizontal movement and at least one zone of vertical movement, comprising, in combination, a pair of inner link chains and a pair of outer link chains, a plurality of carrying vessels each having a front end and a rear end, front connecting means mounting the front ends of said carrying vessels between said inner link chains, rear connecting means mounted the rear ends of said carrying vessels between said outer link chains, said chains being mounted upon a plurality of tandem wheel means and coaxial wheel means in such a manner that at least one tandem wheel means is mounted at the junction between a horizontal zone and a vertical zone; each said tandem wheel comprising a pair of inner wheels each wheel mounted in cantilever on an inner shaft, said inner shafts being coaxially aligned, a pair of outer wheels each wheel mounted in cantilever on an outer shaft, said outer shafts being coaxially aligned with each other and horizontally aligned with and spaced from said inner shafts, each said coaxial wheel means comprising a pair of inner wheels and a pair of outer wheels all mounted on a common shaft, said link chains being of simple construction, through which lubricant generally sufficiently penetrates to provide better abrasion resistance than roller chains, and adapted to high speed, compactness, and twisting in three dimensions, each of said link chains comprising an endless sequence of alternating vertical links and horizontal links, said front connecting means and said rear connecting means each being connected with the outer side of the straight portion of a vertical link, such wheels of said coaxial and tandem wheels that are engaged with the link chain from above having teeth having a space and height therebetween to receive the connecting means, wherein said connecting means comprises an arm connected to said carrying vessel, a cylindrical fitting attached to the outer side of the straight portion of a vertical link, and a clamp bolt secured to said arm to extend through said fitting.

4. A continuous conveyor apparatus having at least one zone or horizontal movement and at least one zone of vertical movement, comprising, in combination, a pair of inner link chains and a pair of outer link chains, a plurality of carrying vessels each having a front end and a rear end, front connecting means mounting the front ends of said carrying vessels between said inner link chains, rear connecting means mounting the rear ends of said carrying vessels between said outer link chains, said chains being mounted upon a plurality of tandem wheel means and coaxial wheel means in such a manner that at least one tandem wheel means is mounted at the junction between a horizontal zone and a vertical zone; each said tandem wheel comprising a pair of inner wheels each wheel mounted in cantilever on an inner shaft, said inner shafts being coaxially aligned, a pair of outer wheels each wheel mounted in cantilever on an outer shaft, said outer shafts being coaxially aligned with each other and horizontally aligned with and spaced from said inner shafts, each said coaxial wheel means comprising a pair of inner wheels and a pair of outer wheels all mounted on a common shaft, said link chains being of simple construction, through which lubricant generally sufficiently penetrates to provide better abrasion resistance than roller chains, and adapted to high speed, compactness, and twisting in three dimensions, each of said link chains comprising an endless sequence of alternating vertical links and horizontal links, said front connecting means and said rear connecting means each being connected with the outer side of the straight portion of a vertical link, such wheels of said coaxial and tandem wheels that are engaged with the link chain from above having teeth having a space and height therebetween to receive the connecting means, said continuous conveyor apparatus further comprising a tension sensor for detecting a tension of said link chain, at least one coaxial wheel movable in the traveling direction of said link chain, and a driving means for inputting a detection signal from said sensor and driving said coaxial wheel to increase said tension when said tension is lower than a predetermined value.

5. A continuous conveyor apparatus having at least one zone or horizontal movement and at least one zone of vertical movement, comprising, in combination, a pair of inner link chains and a pair of outer link chains, a plurality of carrying vessels each having a front end and a rear end, front connecting means mounted the front ends of said carrying vessels between said inner link chains, rear connecting means mounting the rear ends of said carrying vessels between said outer link chains, said chains being mounted upon a plurality of tandem wheel means and coaxial wheel means in such a manner that at least one tandem wheel means is mounted at the junction between a horizontal zone and a vertical zone; each said tandem wheel comprising a pair of inner wheels each wheel mounted in cantilever on an inner shaft, said inner shafts being coaxially aligned, a pair of outer wheels each wheel mounted in cantilever on an outer shaft, said outer shafts being coaxially aligned with each other and horizontally aligned with and spaced from said inner shafts, each said coaxial wheel means comprising a pair of inner wheels and a pair of outer wheels all mounted on a common shaft, said link chains being of simple construction, through which lubricant generally sufficient penetrates to provide better abrasion resistance than roller chains, and adapted to high speed, compactness, and twisting in three dimensions, each of said link chains comprising an endless sequence of alternating vertical links and horizontal links, said front connecting means and said rear connecting means each being connected with the outer side of the straight portion of a vertical link, such wheels of said coaxial and tandem wheels that are engaged with the link chain from above having teeth having a space and height therebetween to receive the connecting means, said continuous conveyor apparatus further comprising a cleaner positioned at a location where said carrying vessel is inverted and turns along a circular path, wherein said cleaner mean has a scraper means coming into contact with a bottom inner surface of said carrying vessel, a spring means for forcing said scraper means against said bottom inner surface.

6. A continuous conveyor apparatus comprising a plurality of wheels located in place, a plurality of endless link chains each turning around said wheel, and a plurality of carrying vessels each having front and rear portions to be connected to said endless link chains and first and second end portions, and said first end portion having an extension end which overlaps said second end portion of an adjacent carrying vessel, each of said link chains comprising an endless sequence of alternating vertical links and horizontal links, said front connecting means and said rear connecting means each being connected with the outer side of the straight portion of a vertical link.

7. The apparatus of claim 2, wherein said inner wheels of said coaxial wheel mean is a sprocket wheel comprising a main body, bases provided around said main body and spaced apart with a predetermined pitch sufficient to provide a gap to accommodate the width of said front connecting means and a part of said rear connecting means and having a height sufficient to receive said front connecting means and a part of said rear connecting means between said bases, and teeth each mounted on said bases and engaged with a horizontal link of said link chain.

8. A continuous conveyor apparatus having at least one zone or horizontal movement and at least one zone of vertical movement, comprising, in combination, a pair of inner link chains and a pair of outer link chains, a plurality of carrying vessels each having a front end and a rear end, front connecting means mounted the front ends of said carrying vessels between said inner link chains, rear connecting means mounting the rear ends of said carrying vessels between said outer link chains, said chains being mounted upon a plurality of tandem wheel means and coaxial wheel means in such a manner that at least one tandem wheel means is mounted at the junction between a horizontal zone and a vertical zone; each said tandem wheel comprising a pair of inner wheels each wheel mounted in cantilever on an inner shaft, said inner shafts being coaxially aligned, a pair of outer wheels each wheel mounted in cantilever on an outer shaft, said outer shafts being coaxially aligned with each other and horizontally aligned with and spaced from said inner shafts, each said coaxial wheel means comprising a pair of inner wheels and a pair of outer wheels all mounted on a common shaft, said link chains being of simple construction, through which lubricant generally sufficiently penetrates to provide better abrasion resistance than roller chains, and adapted to high speed, compactness, and twisting in three dimensions, each of said link chains comprising an endless sequence of alternating vertical links and horizontal links, said front connecting means and said rear connecting means each being connected with the outer side of the straight portion of a vertical link, such wheels of said coaxial and tandem wheels that are engaged with the link chain from above having teeth having a space and height therebetween to receive the connecting means, said continuous conveyor apparatus further comprising a cleaner positioned at a location where said carrying vessel is inverted, wherein said cleaner mean has a wheel means at which said vessels turn along with a circular path as defined by the wheel means, a scraper means coming into contact with a bottom inner surface of said carrying vessel, a spring means for forcing said scraper means against said bottom inner surface.

9. A continuous conveyor apparatus having at least one zone or horizontal movement and at least one zone of vertical movement, comprising, in combination, a pair of inner link chains and a pair of outer link chains, a plurality of carrying vessels each having a front end and a rear end, front connecting means mounting the front ends of said carrying vessels between said inner link chains, rear connecting means mounting the rear ends of said carrying vessels between said outer link chains, said chains being mounted upon a plurality of tandem wheel means and coaxial wheel means in such a manner that at least one tandem wheel means is mounted at the junction between a horizontal zone and a vertical zone; each said tandem wheel comprising a pair of inner wheels each wheel mounted in cantilever on an inner shaft, said inner shafts being coaxially aligned, a pair of outer wheels each wheel mounted in cantilever on an outer shaft, said outer shafts being coaxially aligned with each other and horizontally aligned with and spaced from said inner shafts, each said coaxial wheel means comprising a pair of inner wheels and a pair of outer wheels all mounted on a common shaft, said link chains being of simple construction, through which lubricant generally sufficiently penetrates to provide better abrasion resistance than roller chains, and adapted to high speed, compactness, and twisting in three dimensions, each of said link chains comprising an endless sequence of alternating vertical links and horizontal links, said front connecting means and said rear connecting means each being connected with the outer side of the straight portion of a vertical link, such wheels of said coaxial and tandem wheels that are engaged with the link chain from above having teeth having a space and height therebetween to receive the connecting means, wherein said connecting means comprises a cylindrical fitting attached to an upper portion of said link chain and an arm connected to said carrying vessel at one end and rotatably mounted within said cylindrical fitting at the other end.

10. The apparatus of claim 9, wherein said cylindrical fitting is secured on the outer side of the straight portion of a vertical link by welding.

11. The apparatus of claim 9, wherein said cylindrical fitting is formed integrally with the outer side of the straight portion of a vertical link by forging.

12. The apparatus of claim 9, wherein seal means is provided between said cylindrical fitting and said the other end of said arm to keep the inside of said cylindrical fitting clean from dust, mud or the like.

* * * * *